(12) United States Patent
Bliss

(10) Patent No.: US 10,640,159 B2
(45) Date of Patent: May 5, 2020

(54) STAIR-CLIMBING REMOTE CONTROL UTILITY WAGON

(71) Applicant: Eric Bliss, Canton, TX (US)

(72) Inventor: Eric Bliss, Canton, TX (US)

(*) Notice: Subject to any disclaimer, the term of this patent is extended or adjusted under 35 U.S.C. 154(b) by 194 days.

(21) Appl. No.: 15/811,472

(22) Filed: Nov. 13, 2017

(65) Prior Publication Data

US 2019/0144054 A1 May 16, 2019

(51) Int. Cl.
| | |
|---|---|
| *B62D 55/075* | (2006.01) |
| *B62D 51/00* | (2006.01) |
| *B62D 55/065* | (2006.01) |
| *A61G 5/06* | (2006.01) |
| *B62B 5/02* | (2006.01) |
| *B62D 55/00* | (2006.01) |
| *B62B 5/00* | (2006.01) |

(52) U.S. Cl.
CPC ......... *B62D 55/075* (2013.01); *B62D 51/001* (2013.01); *B62D 51/007* (2013.01); *B62D 55/065* (2013.01); *A61G 5/061* (2013.01); *B62B 5/0026* (2013.01); *B62B 5/0033* (2013.01); *B62B 5/02* (2013.01); *B62D 55/00* (2013.01)

(58) Field of Classification Search
CPC .. B62D 55/075; B62D 51/001; B62D 51/007; B62D 55/065; B62D 55/00; B62B 5/02; B62B 3/002; B62B 3/003; B62B 3/009; B62B 3/022; B62B 5/0026; B62B 5/0033
See application file for complete search history.

(56) References Cited

U.S. PATENT DOCUMENTS

| | | | | |
|---|---|---|---|---|
| 1,511,928 A | * | 10/1924 | Zboril | B62D 57/00 180/8.7 |
| 2,918,738 A | * | 12/1959 | Barr | B60F 3/0007 37/347 |
| 3,142,351 A | | 7/1964 | Green | |
| 3,241,848 A | | 3/1966 | Flory | |
| 3,269,478 A | | 8/1966 | Joslyn | |
| 3,283,839 A | | 11/1966 | Beneke | |
| 3,306,390 A | * | 2/1967 | Jamme | B60B 35/001 180/209 |
| 3,450,219 A | | 6/1969 | Fleming | |
| 3,515,401 A | | 6/1970 | Gross | |
| 4,466,509 A | * | 8/1984 | Kishi | B66F 11/042 182/141 |

(Continued)

*Primary Examiner* — Joseph M Rocca
*Assistant Examiner* — Marlon A Arce

(57) ABSTRACT

The invention is directed to a stair-climbing remote control utility wagon. The wagon provides a forward chassis arm and a rear chassis arm which are interleaved with each other, providing a broad, stable base. The forward chassis arm terminates in a forward chassis, and the rear chassis arm terminates in a rear chassis. The forward chassis and the rear chassis provide powerful, battery-powered electric motors and caterpillar tracks. The forward chassis arm and rear chassis arm are fully articulated by servomotors, providing telescoping segments which may be extended and retracted with servomotors, and the motor housing of the forward chassis arm further provides infrared sensors, which are controlled by a microprocessor to enable the wagon to climb a flight of stairs. The forward chassis arm and rear chassis arm may also be used to elevate the bed of the wagon to any height, up to 48 inches.

11 Claims, 2 Drawing Sheets

(56) References Cited

U.S. PATENT DOCUMENTS

| | | | | |
|---|---|---|---|---|
| 4,565,487 | A * | 1/1986 | Kroczynski | B62D 57/02 180/8.6 |
| 4,834,200 | A * | 5/1989 | Kajita | B62D 57/02 180/8.1 |
| 4,977,971 | A * | 12/1990 | Crane, III | B25J 5/00 180/8.3 |
| 5,137,101 | A * | 8/1992 | Schaeff | B62D 57/00 180/8.1 |
| 5,431,247 | A * | 7/1995 | Kishi | B66F 11/042 182/141 |
| 6,339,861 | B1 * | 1/2002 | Snyder | A47L 9/26 15/323 |
| 6,733,026 | B1 * | 5/2004 | Robberson | B62B 3/02 280/30 |
| 7,053,579 | B2 * | 5/2006 | Moridaira | B25J 9/1674 180/8.6 |
| 7,594,668 | B2 * | 9/2009 | Arceta | A61G 12/001 108/147.19 |
| 7,654,348 | B2 * | 2/2010 | Ohm | B25J 5/005 180/8.2 |
| 8,459,898 | B2 * | 6/2013 | Guntert, Jr. | E01C 19/42 404/85 |
| 8,583,313 | B2 * | 11/2013 | Mian | G05D 1/0229 701/28 |
| 8,655,257 | B2 * | 2/2014 | Spychaiski | F41H 7/005 434/1 |
| 8,813,880 | B2 * | 8/2014 | Gettings | B62D 55/075 180/9.32 |
| 8,875,815 | B2 * | 11/2014 | Terrien | B25J 5/005 180/65.1 |
| 9,920,545 | B2 * | 3/2018 | Witelson | B66B 9/00 |
| 10,399,834 | B2 * | 9/2019 | Artoni | B62D 21/00 |
| 2002/0149176 | A1 * | 10/2002 | Miller | B62B 3/027 280/651 |
| 2005/0229312 | A1 * | 10/2005 | Bishop | A61G 1/0293 5/620 |
| 2006/0290083 | A1 * | 12/2006 | Ruiz | B60B 33/04 280/43.13 |
| 2007/0194540 | A1 * | 8/2007 | Caspi | B62B 5/02 280/5.22 |
| 2012/0175172 | A1 * | 7/2012 | Bouhraoua | B62B 5/0033 180/8.2 |
| 2013/0292925 | A1 * | 11/2013 | Shindelar | B62B 3/02 280/651 |
| 2015/0367901 | A1 * | 12/2015 | Studer | B62D 55/075 180/9.42 |
| 2016/0052534 | A1 * | 2/2016 | Henao | B62B 3/02 280/651 |
| 2017/0232611 | A1 * | 8/2017 | Himes, Jr. | B25J 9/161 700/264 |
| 2017/0349196 | A1 * | 12/2017 | Camarco | B60R 9/06 |
| 2018/0009461 | A1 * | 1/2018 | Rucker | B62B 3/022 |
| 2018/0338413 | A1 * | 11/2018 | Connell | A01C 7/208 |
| 2019/0009845 | A1 * | 1/2019 | Nichol | B62D 55/084 |

\* cited by examiner

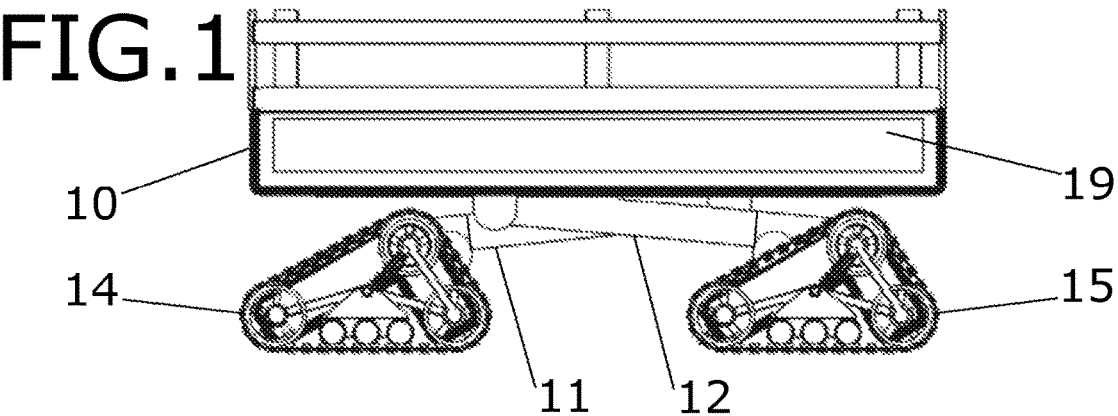
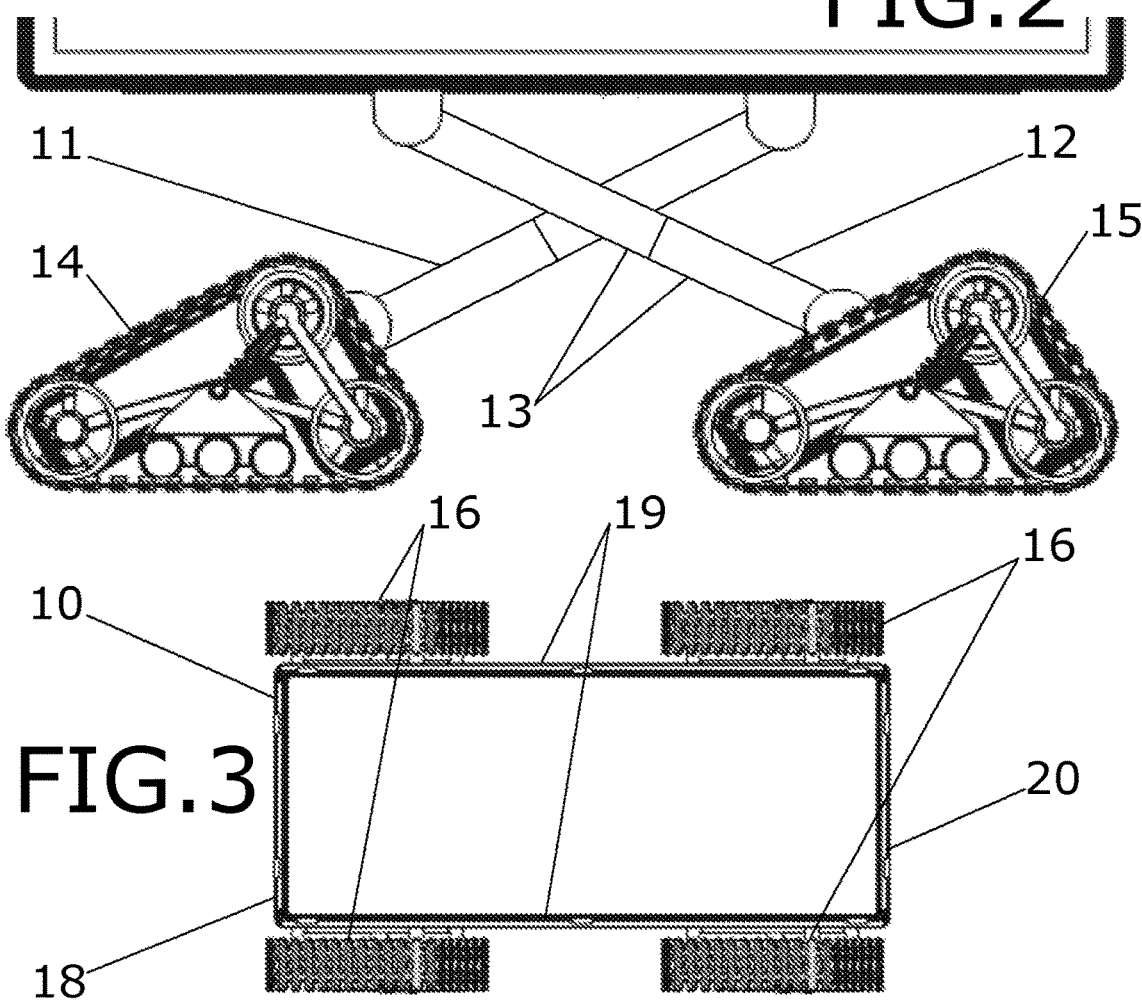
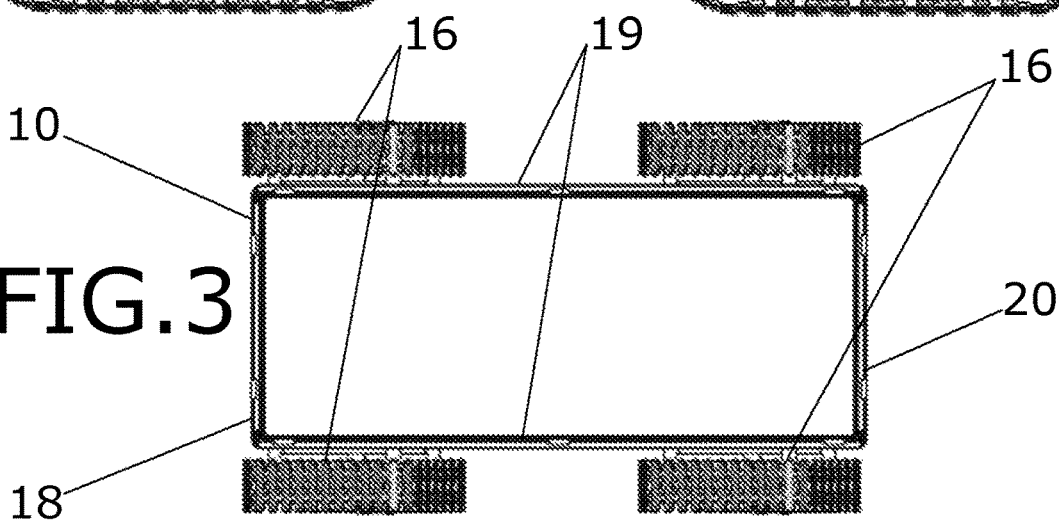

STAIR-CLIMBING REMOTE CONTROL UTILITY WAGON

CROSS-REFERENCE TO RELATED APPLICATIONS

This Application claims the benefit of U.S. Provisional Application No. 62/420,112, filed Nov. 10, 2016, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to disabled assistance devices and in particular to a stair-climbing remote control utility wagon. For millions of elderly and disabled people, as well as those who are recovering from surgery or serious injuries, staying independent is vitally important but a trip to the grocery store can be very challenging. Performing other chores around the home can also be difficult. Grocery bags must be lifted to a particular height to be put away, and for such tasks as painting a room, it would be useful to elevate the necessary tools and supplies, such as a paint can and a roller tray, to a convenient height. Also, while the user may be capable of traversing a flight of stairs without carrying anything, adding bags of groceries or other items to the trip makes it impossible. A device which can carry and elevate such items, and navigate a flight of stairs under its own power, would be very useful.

A search of the prior art reveals various vehicles and associated devices which have been developed to provide means to solve the problems found in stair climbing devices. None are closely related to the present invention, but several include features which resemble those of the present invention. Each has proven to be less than satisfactory in its own way.

Stair-climbing wheel chair, U.S. Pat. No. 3,283,839 (filed Mar. 2, 1965), provides a plurality of wheels mounted on a spider rotatable about a central axis. The balancing means comprises a downwardly-outwardly projecting pivoted arm supported at its lower end by pluralities of rollers mounted on arms projecting from the axis of mounting. The arms rotate about the axis and the rollers also rotate about their own axes, and this arrangement provides a particularly effective means for supporting the chair or other vehicle against tipping and, at the same time, prevents the chair from catching or hanging on the overhanging lip of the stairs. Preventing the rollers from catching on the overhang may be augmented by using belts around some of the rollers.

Stair climbing wheelchair, U.S. Pat. No. 3,142,351 (filed Jan. 19, 1962), provides a framework of a wheelchair which enables stair climbing with a combination of hydraulics and an electric motor, but is very labor intensive for the user.

Stair-climbing vehicle, U.S. Pat. No. 3,450,219 (filed Mar. 13, 1967), provides an improved hand-guided moving dolly having a plurality of wheels, each of which is mounted on one of the radial arms of a rotatable spider. The wheels and the spider are connected in the form of an epicyclic train, all of which is driven by a single power source. The ratio of the arm lengths to the wheel radii is such that the moment necessary to turn the spider is slightly greater than the moment needed to turn the wheels on a flat surface. In operation, the power applied to the wheels will move the dolly horizontally until it contacts the first riser of a flight of stairs. The moment needed to turn the wheels now becomes greater by reason of the obstruction, thereby causing the spider to rotate and climb the first step. The torque on the wheels remains constant during rotation of the spider and, as soon as the vertical transition is complete, the torque on the wheels will cause the horizontal movement of the dolly to continue. The wheels and spiders on each side of the dolly are connected and driven through a differential drive whereby the spiders on each side are caused to rotate together.

Stair-climbing vehicle, U.S. Pat. No. 3,241,848 (filed Dec. 27, 1963), provides a vehicle having at least one multiple-armed wheel-supporting spider with a wheel mounted near the end of each arm. The wheels are connected by means of an epicyclic drive to a power source, which may be the occupant of the vehicle. On smooth terrain one of the wheels on the spider rests against the terrain and is driven in forward or reverse motion through the epicyclic drive, propelling the vehicle accordingly. On rough terrain, such as stairs, the multiple-armed spider is driven in rotation while the central or sun gear of the epicyclic drive, or its equivalent, is held stationary with respect to the frame of the vehicle. A 1:1 ratio between U.S. Pat. No. 3,241,848 Patented Mar. 22, 1966 the sun gear or its equivalent, and a planet gear or its equivalent attached coaxially to each wheel, causes the wheel, although rotating with respect to the spider arm, to undergo no rotation on its axis with respect to the frame of the vehicle. As the spider rotates, successive wheels are brought to bear against successive portions of the rough terrain, such as successive stairs of a flight of stairs, and there placed, begin to support the weight of the vehicle.

Stair climbing dolly, U.S. Pat. No. 3,515,401 (filed Nov. 6, 1968), provides a frame, each side of which is in the shape of an elongated, narrow, inverted U which is narrower at the top than at the bottom. Reinforcing cross members extend between the arms of each U-frame part. A group of wheels is further provided at each side, arranged about a common axis, which are manually moved about said axis by levers successively from step to step of the stairway. One way clutch bearings permit forward rotation of the groups of wheels about said axis but prevent reverse rotation of said wheels. A tilting mechanism facilitates loading of a piece of equipment on the apparatus.

Stair climbing wheel chair, U.S. Pat. No. 3,269,478 (filed Dec. 6, 1965), provides a wheel chair is provided with front and rear rests on which it can be supported in a substantially normal position when climbing a stairway or the like, while the wheels which are normally used are retracted. The chair is also provided with a pair of front legs and a pair of rear legs, which are pivoted so that they swing fore-and-aft of the chair. Each of the legs is extendible lengthwise of itself by means of a power device, so that the chair can be raised off its supporting rests for fore-and-aft movement on its legs. In addition, another power device is connected between the chair and at least one of the legs for pivotally driving the legs so that the chair can be moved forward or back while it is supported by the legs. Control means are likewise provided for operating the lifting and driving power devices, so that the occupant of the chair can raise the chair up on its legs, move it forward or back over a stair or stairs and set it down on its rests on the stairs. The legs are then retracted, swung into position on the next set of steps and extended to raise the chair again, so that it can be moved into a new position, either up or down the stairs, or even on the level 'or other walking surface.

Some of the prior art inventions present certain disadvantages. The present invention has been developed for the purpose of addressing and resolving these disadvantages. A stair-climbing remote control utility wagon, which provides a bed with siderails on an articulated, tracked pair of chassis, would resolve these problems.

SUMMARY OF THE INVENTION

Accordingly, the invention is directed to a stair-climbing remote control utility wagon. The wagon provides a forward chassis arm and a rear chassis arm which are interleaved with each other, providing a broad, stable base. The forward chassis arm terminates in a forward chassis, and the rear chassis arm terminates in a rear chassis. The forward chassis and the rear chassis provide powerful, battery-powered electric motors and caterpillar tracks. The forward chassis arm and rear chassis arm are fully articulated by servomotors, providing telescoping segments which may be extended and retracted with servomotors, and the motor housing of the forward chassis arm further provides infrared sensors, which are controlled by a microprocessor to enable the wagon to climb a flight of stairs. The forward chassis arm and rear chassis arm may also be used to elevate the bed of the wagon to any height, up to 48 inches.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 1 is a side view of the first exemplary embodiment, displaying the wagon 10, the forward chassis arm 11, the rear chassis arm 12, the forward chassis 14, the rear chassis 15, and the side panel 19.

FIG. 2 is a side view of the lower portion of the first exemplary embodiment with the chassis arms extended, displaying the forward chassis arm 11, the rear chassis arm 12, the segments 13, the forward chassis 14, and the rear chassis 15.

FIG. 3 is a top view of the first exemplary embodiment, displaying the wagon 10, the caterpillar tracks 16, the bed 17, the front panel 18, the side panels 19, and the rear panel 20.

DETAILED DESCRIPTION OF THE INVENTION

Figure 4:
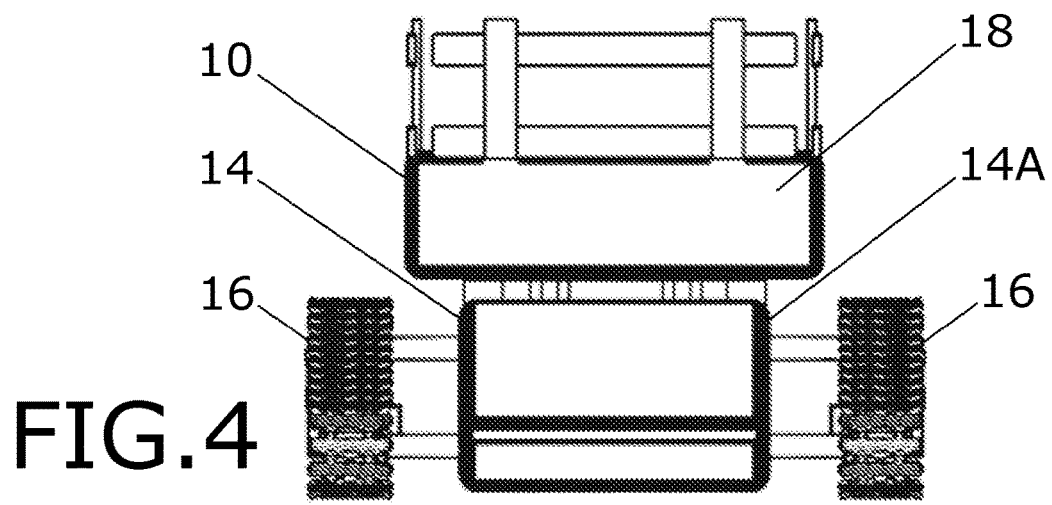
FIG. 4 is a front view of the first exemplary embodiment, displaying the wagon 10, the forward chassis 14, the motor housing 14A, the caterpillar tracks 16, and the front panel 18.
Figure 5:
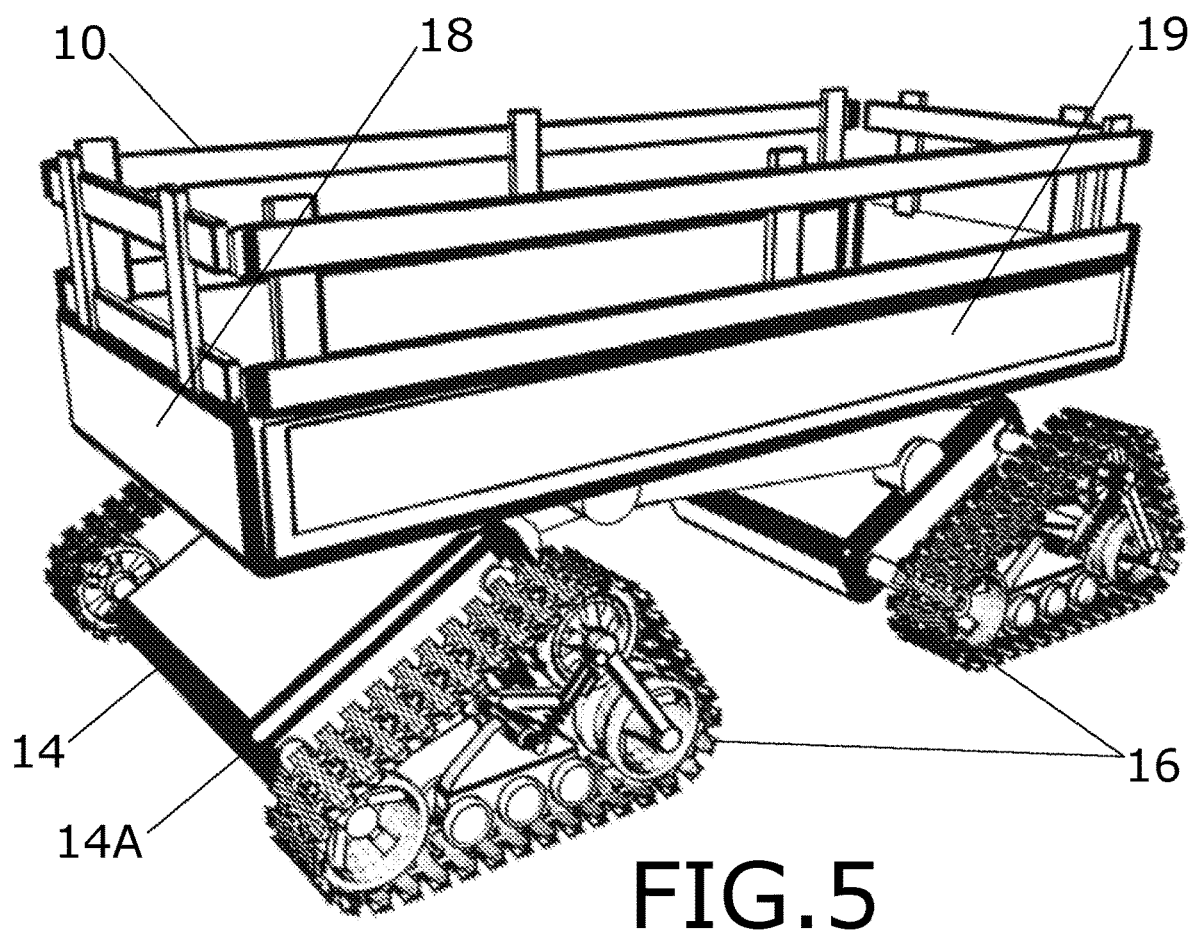
FIG. 5 is a side perspective view of the first exemplary embodiment, displaying the wagon 10, the forward chassis 14, the motor housing 14A, the caterpillar tracks 16, the front panel 18, and the side panel 19.

Referring now to the invention in more detail, the invention is a stair-climbing remote control utility wagon 10.

The first exemplary embodiment is comprised of a wagon 10, which provides a forward chassis arm 11 and a rear chassis arm 12 which are interleaved with each other, providing a broad, stable base. The forward chassis arm 11 terminates in a forward chassis 14, and the rear chassis arm 12 terminates in a rear chassis 15. The wagon 10 further provides a rectangular bed 17 mounted on top of the forward chassis arm 11 and the rear chassis arm 12. The bed 17 is enclosed by a front panel 18, two side panels 19, and a rear panel 20, which provide siderails and may be lowered to a horizontal position, and securely latched in the vertical position or the horizontal position as desired, enabling loading and unloading from any direction.

The forward chassis 14 and the rear chassis 15 may be canted to the left or the right to provide steering with a tight turning radius. The forward chassis 14 and the rear chassis 15 further provide powerful, battery-powered reversible electric motors, which are enclosed in motor housings 14A which also provide long-life, rechargeable lithium ion batteries. Preferably, the forward chassis 14 and the rear chassis 15 further provide retractable power cords which may be plugged into any grounded wall outlet, for the purpose of recharging the batteries.

The forward chassis 14 and the rear chassis 15 further provide heavy-duty rubber caterpillar tracks 16 mounted on hardbar suspensions, which prevent damage to the user's flooring, sidewalk, and driveway surfaces. The forward chassis arm 11 and rear chassis arm 12 are fully articulated by servomotors, and provide telescoping segments 13 which may also be extended and retracted with servomotors.

The motor housing 14A of the forward chassis 14 further provides infrared sensors, which are controlled by a microprocessor to enable the wagon 10 to climb a flight of stairs. The forward chassis arm 11 and rear chassis arm 12 may also be used to elevate the bed of the wagon 10 to any height, preferably up to 48 inches, by extending the telescoping segments 13. Optionally, the wagon 10 may provide a leveling system which may be comprised of a gyrostabilizer, a plurality of leveling arms, and servomotors, or other devices. Such a leveling system is controlled by the microprocessor, such that the bed 17 is kept level relative to the ground regardless of whether the front chassis 14 and rear chassis 15 are traversing a flight of stairs or other difficult terrain.

The wagon 10 is entirely controlled by a remote control. Preferably, the remote control provides a simple joystick and throttle control system. Electronic components of the remote control preferably include an internal ring antenna, a transmitter capable of operating on Radio Frequency (RF) or any one of several other short-range wireless communication protocols, a battery, and a deactivation button. Other electronic components of the system, which are installed in the motor housing 14A of the forward chassis 14, preferably include a memory device, a microprocessor, an internal ring antenna, a plurality of infrared sensors, and a transmitter capable of operating on the communication protocol of the remote control.

The second exemplary embodiment is similar in structure and function to the first exemplary embodiment, with the following modifications. The bed 17 provides one or two folding, padded, forward facing seats suitable for infants or toddlers, configured in a conventional fore-and-aft arrangement, which provide five-point harnesses similar to those provided by vehicle safety seats. The seats fold flat into the bed 17, leaving a flat surface. The second exemplary embodiment is intended for use by an elderly or disabled user who is responsible for the care of young children, and may be used to transport the children into or out of the user's residence. A removable fabric canopy, and other features suitable for a carriage for small children such as cup holders and a diaper bag, may also be provided.

To use the first exemplary embodiment, the user may elect to lower the front panel 18, one or both of the side panels 19, or the rear panel 20 to a horizontal position as desired. The user may then load grocery bags or other cargo into the bed, and if one or more panels has been lowered, raise the panels to a vertical position and secure them with the latches. The user may then operate the remote control to activate the wagon 10 and navigate the wagon wherever the user may choose.

The forward chassis arm 11, the rear chassis arm 12, the forward chassis 14, the motor housings 14A, the rear chassis 15, the front panel 18, the side panels 19, the rear panel 20, the suspensions, the electric motors, the batteries, and the latches are preferably manufactured from rigid, durable materials which are corrosion resistant and provide substantial structural strength, such as painted steel, titanium, or aluminum alloy. The caterpillar tracks 16 are preferably manufactured from a flexible, durable material such as rubber.

The bed 17 and the siderails are preferably manufactured from rigid, durable materials which may provide a decorative element, such as painted steel, brass, and polished hardwood. The remote control and wagon-mounted electronic components are preferably manufactured from rigid, durable materials, such as stainless steel, brass, plastic, acrylic polymer, and aluminum alloy. The power cords are preferably manufactured from braided copper alloy wire sheathed in plastic.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A utility wagon for stair climbing and traversing other difficult terrain, comprising:
    a forward chassis arm and a rear chassis arm which are interleaved with each other, with the forward chassis arm terminating in a forward chassis, and the rear chassis arm terminating in a rear chassis, wherein the forward chassis arm and rear chassis arm are fully extendable by servomotors, and provide telescoping segments which extend and retract with the servomotors; and
    a leveling system having one or more gyrostabilizers, the forward and rear chassis arms, and one or more servomotors that are controlled by a microprocessor, such that a rectangular bed is kept level relative to the ground regardless of whether the front chassis and rear chassis are traversing a flight of stairs or other terrain.

2. The utility wagon of claim 1,
    wherein the rectangular bed is mounted on top of the forward chassis arm and the rear chassis arm, the rectangular bed being enclosed by a front panel, two side panels, and a rear panel; and
    siderails which are adjustable to a horizontal position and which are securely latched in the vertical position or the horizontal position as desired.

3. The utility wagon of claim 1, wherein the forward chassis and the rear chassis are canted left or right to provide steering with a tight turning radius.

4. The utility wagon of claim 1, wherein the forward chassis and the rear chassis provide reversible electric motors, which are enclosed in motor housings and are powered by rechargeable lithium ion batteries.

5. The utility wagon of claim 4, wherein the forward chassis and the rear chassis provide retractable power cords for plugging into a grounded wall outlet to recharge the lithium ion batteries.

6. The utility wagon of claim 1, wherein the forward chassis and the rear chassis provide rubber caterpillar tracks mounted on hardbar suspensions.

7. The utility wagon of claim 1, wherein the forward chassis arm and rear chassis arm are configured to elevate the rectangular bed of the wagon by extending the telescoping segments.

8. The utility wagon of claim 1, wherein the utility wagon is controlled by a remote control which provides a joystick and throttle control system, the remote control comprising at least an internal ring antenna, a transmitter capable of operating on Radio Frequency (RF) or other short-range wireless communication protocol, a battery, and a deactivation button.

9. A utility wagon for stair climbing and traversing other difficult terrain, comprising:
    a forward chassis arm and a rear chassis arm which are interleaved with each other, with the forward chassis arm terminating in a forward chassis, and the rear chassis arm terminating in a rear chassis; and
    a memory device, a microprocessor, an internal ring antenna, a plurality of infrared sensors, and a transmitter capable of operating on the communication protocol of a remote control are installed in a motor housing of the forward chassis.

10. A utility wagon for stair climbing and traversing other difficult terrain, comprising:
    a forward chassis arm and a rear chassis arm which are interleaved with each other, with the forward chassis arm terminating in a forward chassis, and the rear chassis arm terminating in a rear chassis; and
    a bed mounted on top of the forward and rear chassis arms,
    wherein the bed provides one or two folding, padded, forward facing seats configured in a fore-and-aft arrangement.

11. The utility wagon of claim 10, wherein the seats provide five-point harnesses and are foldable flat into the bed, leaving a flat surface.

* * * * *